(12) United States Patent
Woodruff et al.

(10) Patent No.: US 8,908,715 B2
(45) Date of Patent: Dec. 9, 2014

(54) METHOD AND SYSTEM FOR A HIGH-SPEED BACKWARD-COMPATIBLE ETHERNET CONNECTOR

(75) Inventors: William C. Woodruff, Pleasanton, CA (US); Scott Powell, Aliso Viejo, CA (US)

(73) Assignee: Broadcom Corporation, Irvine, CA (US)

( * ) Notice: Subject to any disclaimer, the term of this patent is extended or adjusted under 35 U.S.C. 154(b) by 437 days.

(21) Appl. No.: 13/047,416

(22) Filed: Mar. 14, 2011

(65) Prior Publication Data

US 2012/0236851 A1 Sep. 20, 2012

(51) Int. Cl.
*H04L 12/66* (2006.01)
*H04L 12/46* (2006.01)
*H01R 24/28* (2011.01)

(52) U.S. Cl.
CPC ............ *H04L 12/4625* (2013.01); *H01R 24/28* (2013.01)
USPC ........................................................ 370/463

(58) Field of Classification Search
None
See application file for complete search history.

(56) References Cited

U.S. PATENT DOCUMENTS

| | | | | |
|---|---|---|---|---|
| 5,784,573 A * | 7/1998 | Szczepanek et al. | ......... | 709/250 |
| 5,923,663 A * | 7/1999 | Bontemps et al. | ............ | 370/445 |
| 6,175,865 B1 * | 1/2001 | Dove et al. | .................... | 709/220 |
| 6,460,078 B1 * | 10/2002 | Dove et al. | .................... | 709/220 |
| 7,340,511 B2 * | 3/2008 | Dove | ............................ | 709/220 |
| 7,366,771 B2 * | 4/2008 | Dove | ............................ | 709/220 |
| 8,064,473 B2 * | 11/2011 | He | ................................ | 370/419 |
| 2003/0174726 A1 * | 9/2003 | Dove | ............................ | 370/463 |
| 2003/0191883 A1 * | 10/2003 | April | ............................ | 710/305 |
| 2004/0039850 A1 * | 2/2004 | Chen et al. | ........................ | 710/1 |
| 2004/0198105 A1 * | 10/2004 | Dove | ............................ | 439/894 |
| 2005/0002328 A1 * | 1/2005 | Chan | ............................ | 370/217 |
| 2005/0021734 A1 * | 1/2005 | Chan | ............................ | 709/224 |
| 2005/0036506 A9 * | 2/2005 | Dove | ............................ | 370/463 |
| 2007/0117431 A1 * | 5/2007 | Yen et al. | ....................... | 439/171 |
| 2007/0147412 A1 * | 6/2007 | Wei et al. | ........................ | 370/463 |
| 2008/0101479 A1 * | 5/2008 | Sefidvash | ....................... | 375/258 |
| 2008/0310441 A1 * | 12/2008 | Hann | ............................. | 370/419 |
| 2009/0097389 A1 * | 4/2009 | Diab et al. | ..................... | 370/201 |
| 2009/0132742 A1 * | 5/2009 | Simmons et al. | ............. | 710/106 |
| 2009/0232151 A1 * | 9/2009 | Furlong et al. | ................. | 370/419 |
| 2010/0104015 A1 * | 4/2010 | Chatterjee et al. | ........ | 375/240.16 |
| 2010/0328087 A1 * | 12/2010 | Kanno et al. | ................... | 340/661 |
| 2011/0096793 A1 * | 4/2011 | Bar-Niv et al. | ................ | 370/463 |
| 2012/0056491 A1 * | 3/2012 | Ho | ................................. | 307/116 |
| 2012/0057694 A1 * | 3/2012 | Lee et al. | ........................ | 379/423 |

FOREIGN PATENT DOCUMENTS

WO WO 2004014043 A1 * 2/2004 .............. H04L 29/06

* cited by examiner

*Primary Examiner* — Ayaz Sheikh
*Assistant Examiner* — Peter Chau
(74) *Attorney, Agent, or Firm* — Oblon, Spivak, McClelland, Maier & Neustadt, L.L.P.

(57) ABSTRACT

Aspects of a method and system for a high-speed backward-compatible Ethernet connector are provided. Which, if any, of a plurality of pins of a connector are coupled to a first portion of one or more circuits of an Ethernet PHY may be controlled via one or more switching elements in the Ethernet PHY. The switching element(s) may reside in a signal path between the first portion of the one or more circuits and a second portion of the one or more circuits. One or more configurations of the switching element(s) may couple less than all of the plurality of pins to the first circuit(s). Each signal into and out of the switching element(s) may be a digital signal. The first portion of the one or more circuit may comprise a media independent interface. The second portion of the one or more circuit may comprise a media dependent interface.

18 Claims, 13 Drawing Sheets

METHOD AND SYSTEM FOR A HIGH-SPEED BACKWARD-COMPATIBLE ETHERNET CONNECTOR

INCORPORATION BY REFERENCE

This patent application makes reference to U.S. patent application Ser. No. 12/853,945 filed on Aug. 10, 2010, which is hereby incorporated herein by reference in its entirety.

FIELD OF THE INVENTION

Certain embodiments of the invention relate to networking. More specifically, certain embodiments of the invention relate to a method and system for a high-speed backward-compatible Ethernet connector.

BACKGROUND OF THE INVENTION

Communications networks and in particular Ethernet networks, are becoming an increasingly popular means of exchanging data of various types and sizes for a variety of applications. In this regard, Ethernet networks are increasingly being utilized to carry voice, data, and multimedia traffic. Accordingly more and more devices are being equipped to interface to Ethernet networks. Ethernet-over-copper standards 10BASE-T, 100BASE-T, 1GBASE-T, and 10GBASE-T specify a common "RJ-45" connector.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for a configurable high-speed backward-compatible Ethernet connector, substantially as illustrated by and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for a high-speed backward-compatible Ethernet connector. In various embodiments of the invention, which, if any, of a plurality of pins of a connector are coupled to a first portion of one or more circuits of an Ethernet PHY may be controlled via one or more switching elements in the Ethernet PHY. The one or more switching elements may reside in a signal path between the first portion of the one or more circuits of the Ethernet PHY and a second portion of the one or more circuits of the Ethernet PHY. The first portion of the one or more circuits may comprise a media independent interface. The second portion of the one or more circuits may comprise a media dependent interface. One or more configurations of the one or more switching elements may couple less than all of the plurality of pins to the first portion of the one or more circuits. Each signal into and out of the one or more switching elements may be a digital signal. A voltage and/or current present on one or more of the plurality of pins may be detected, and the one or more switching elements may be controlled based on a result of the detecting. The Ethernet PHY may be configurable to support a plurality of Ethernet physical layer standards. The one or more switching elements may be configured based on which one of said plurality of physical layer standards said Ethernet PHY is configured to support.

A first subset of the plurality of pins may be coupled to the first portion of the one or more circuits when a data rate of communications via the connector is less than or equal to the maximum data rate set forth in the 10GBASE-T standard. A second subset of the plurality of pins may be coupled to the first portion of the one or more circuits when a data rate of communications via the connector is greater than the maximum data rate set forth in the 10GBASE-T standard. A first subset of the plurality of pins may be coupled to the first portion of the one or more circuits when the Ethernet PHY is configured to communicate in accordance with one of 10BASE-T, 100BASE-T, 1GBASE-T, and 10GBASE-T standards. A second subset of the plurality of pins may be coupled to the first portion of the one or more circuits when the Ethernet PHY is configured to communicate in accordance with one of the 40GBASE-T and 1000BASE-T standards. The one or more switching elements may switch between one or more pins mounted on a first wall of the connector and one or more pins mounted on a second wall of the connector opposite the first wall. The first portion of the one or more circuits, the second portion of the one or more circuits, and the one or more switching elements may be integrated on a single integrated circuit die.

Figure 1:
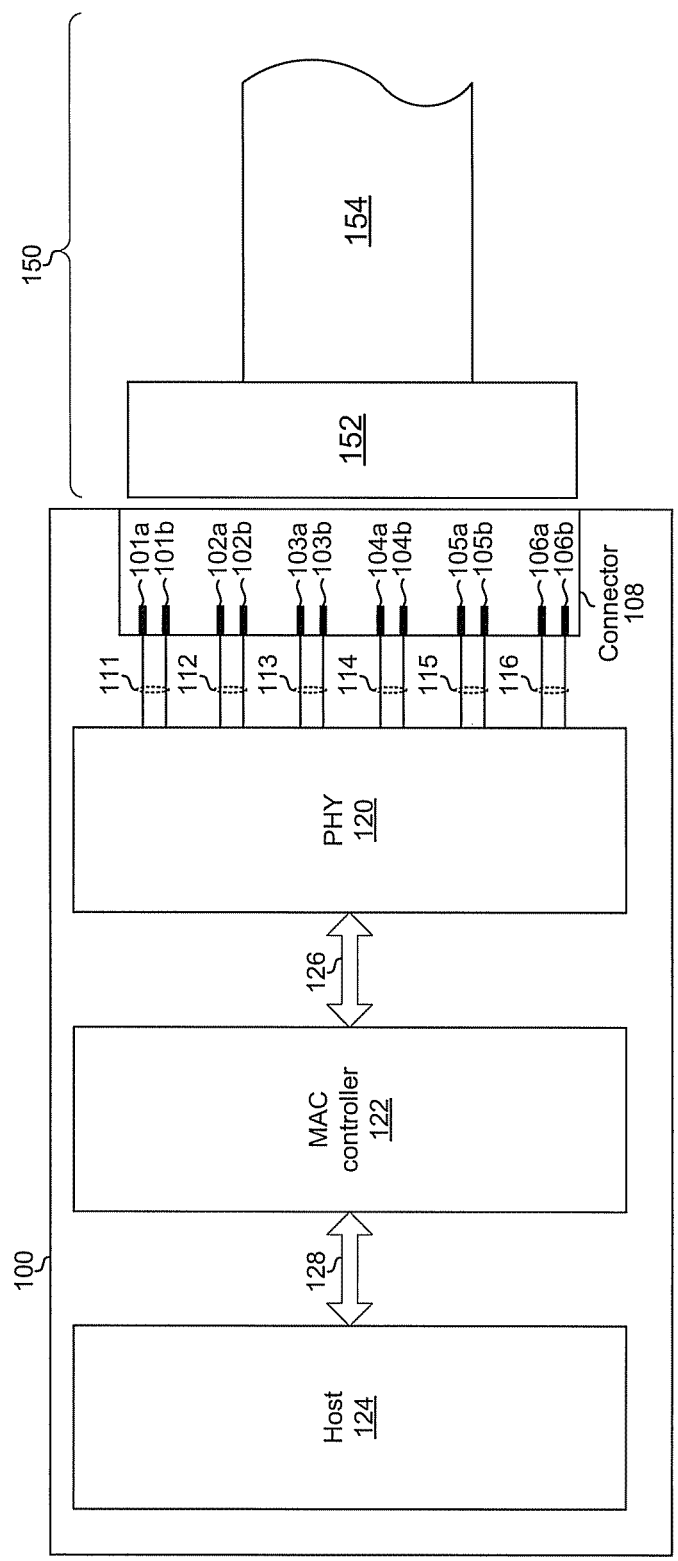
FIG. 1 is a block diagram of an exemplary Ethernet device, in accordance with an embodiment of the invention.

FIG. 1 is a block diagram of an exemplary Ethernet device, in accordance with an embodiment of the invention. Referring to FIG. 1 there is shown an Ethernet device 100 comprising a host subsystem 124, a media access control (MAC)

controller 122, physical layer device (PHY) 120, a connector 108 of the device 100, and a cable assembly 150 comprising a connector 152, and one or more conductors 154.

The cable assembly 150 may comprise the connector 152, one or more conductors 154, and one or more connectors or other terminations on the opposite end (not shown) of the cable assembly 150. The conductor(s) 154 may comprise, for example, one or more twisted pairs of aluminum or copper. Characteristics of the cable assembly 150, such as number of conductors 154, presence of shielding, length of the cable assembly 150, and/or wire gauge of the conductor(s) 154 may determine which protocols and/or which data rates the cable assembly 150 may support. For example, the cable assembly may be a Cat 7a, Cat 7, Cat 6a, Cat 5e, or Cat 3 cable assembly, or a standard to be defined in the future. In some instances, mechanical and electrical characteristics of the connector 152 may be compatible with a standard RJ-45 type Ethernet connector. In some instances, mechanical and electrical characteristics of the connector 152 may be compatible with an ARJ-45 type Ethernet connector. In an exemplary embodiment of the invention, the cable assembly 150 may be compatible with both RJ-45 and ARJ-45 connectors. An ARJ-45 may, for example, have specifications similar to or the same as those found on the CA76 family of patch cable Cords from Bel Stewert Connector. In such an embodiment, the cable assembly 150 may comprise four twisted pairs terminated in four of the six pin pairs, comprise six twisted pairs terminated in six pin pairs of the connector 152, or comprise any number of twisted pairs terminated in one or more of the six pin pairs.

The host 124 may comprise suitable logic, circuitry, interfaces, and/or code that may be operable to handle functionality of OSI layer 3 and above in the network device 100. The host 124 may, for example, implement an operating system of the host 125 and may be operable to perform system control and management. The host 124 may communicate with the MAC 122 via, for example, a PCI or other similar or suitable bus 128.

The MAC 122 may comprise suitable logic, circuitry, interfaces, and/or code that may be operable to perform data encapsulation and/or media access management, where media access management may comprise operations that handle conflicts arising from multiple network devices sharing the cable assembly 150. In this regard, the MAC 122 may provide an interface between the Ethernet PHY 120 and the host 124. The MAC 122 may communicate with the host 124 via a PCI or similar bus 128 and may communicate with the Ethernet PHY 120 via a bus 126. In an embodiment of the invention, the MAC 122 may comprise media independent interface (xxxMII) for communicating over the bus 126. In this regard, "media independent interface (xxxMII)" is utilized generically herein and may refer to a variety of interfaces including, but not limited to, a media independent interface (MII), a gigabit MII (GMII), a reduced MII (RMII), reduced gigabit MII (RGMII), 10 gigabit MII (XGMII), 40 gigabit MII (XLGMII), and 100 gigabit MII (CGMII) or a MII extender such as the 10 gigabit XAUI.

The Ethernet PHY 120 may comprise a twisted pair Ethernet PHY capable of operating at a variable data rate and supporting various Ethernet standards. The Ethernet PHY may comprise a media independent interface (xxxMII) for communicating with the MAC 122 via the bus 126. The Ethernet PHY 120 may be operable to support, for example, one or more of 10BASE-T, 100BASE-T, 1GBASE-T, 10GBASE-T, 40GBASE-T, and 100GASE-T. In an embodiment of the invention, the PHY 120 may comprise one or more switching elements via which one or more of the pins 101-106 may be coupled to transmit and/or receive circuitry of the PHY 120 via the traces 111-116.

The connector 108 may be compatible with both RJ-45 type connectors and ARJ-45 connectors. The connector 108 may comprise pins 101a and 101b (pin pair 101), pins 102a and 102b (pin pair 102), pins 103a and 103b (Pin pair 103), pins 104a and 104b (pin pair 104), pins 105a and 105b (pins 105), and pins 106a and 106b (pin pair 106).

In operation, one or more switching elements in the PHY 120 may be configured to determine which of the pins 101a-106a and 101b-106b are coupled to transmit and/or receive circuitry of the PHY 120.

Figure 2A:
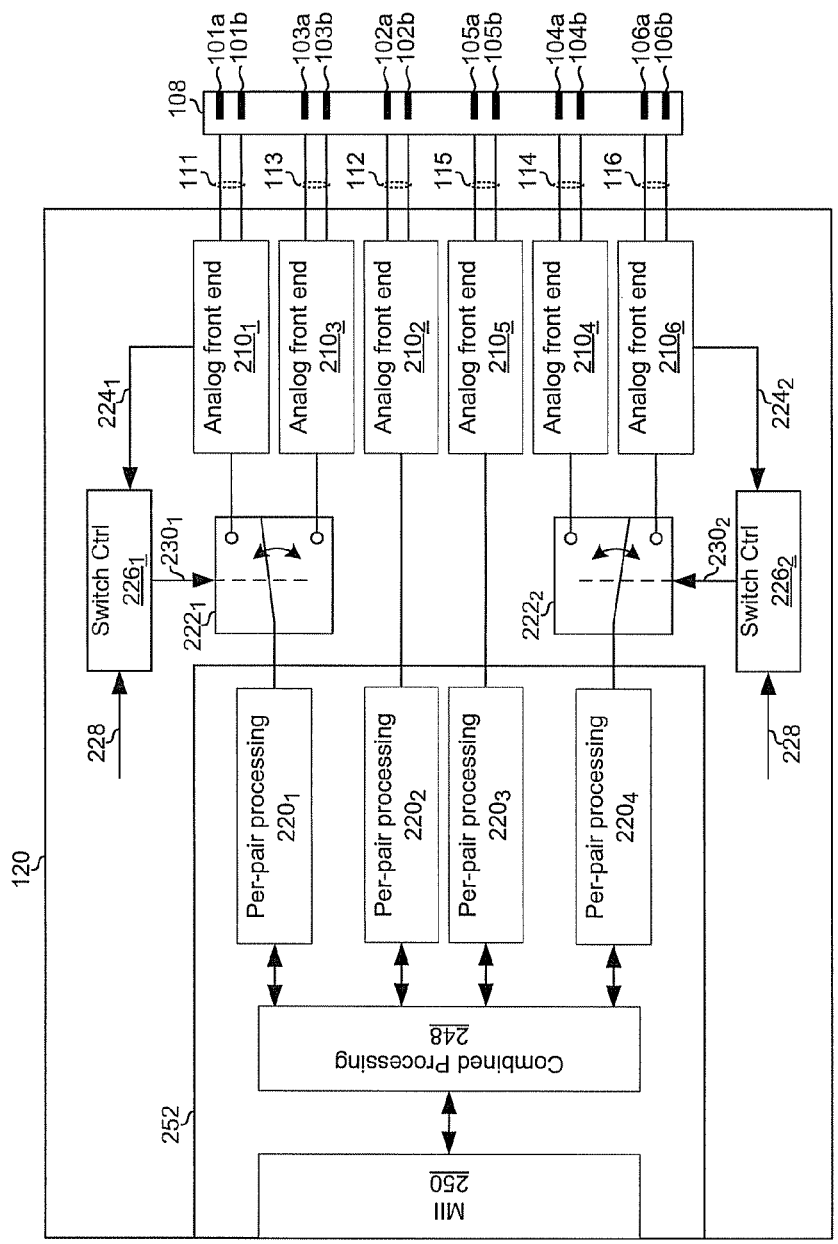
FIG. 2A is a block diagram illustrating an exemplary Ethernet PHY operable to control which pins of a connector are coupled to transmit and/or receive circuitry of the PHY, in accordance with an embodiment of the invention.

FIG. 2A is a block diagram illustrating an exemplary Ethernet PHY operable to control which pins of a connector are coupled to transmit and/or receive circuitry of the PHY, in accordance with an embodiment of the invention. Referring to FIG. 2A, the PHY 120 comprises digital processing module 252 representing suitable logic, circuitry, interfaces, and/or code for implementing digital signal processing functions; switching elements $222_1$ and $222_2$; switch control modules $226_1$ and $226_2$ representing suitable logic, circuitry, interfaces, and/or code for controlling switching elements $222_1$ and $222_2$; and analog processing modules $210_1$-$210_6$ representing suitable logic, circuitry, interfaces, and/or code for implementing analog front end functions. In an embodiment of the invention, the digital processing module 252, the switching elements $222_1$ and $222_2$, the switch control modules $226_1$ and $226_2$, the analog processing modules $210_1$-$210_6$, and other components of the PHY 120 may be integrated on a single integrated circuit die. In various embodiments of the invention, such a die may, for example, be integrated on and/or within the connector 108, on and/or within a cable assembly, and on and/or within a network interface card.

The digital processing module 252 represents suitable logic, circuitry, interfaces, and/or code that may be operable to perform various digital-domain functions. The digital processing modules 252 may be operable to, for example, perform various digital signal processing operations such as echo cancellation, crosstalk cancellation, error correction, encoding, decoding, and/or filtering and/or any other handling of digital signals and/or information. The digital processing module 252 may comprise sub-modules $220_1$-$220_4$ which may process information on a per-pair basis. The digital processing module 252 may comprise sub-module 248 which may combine and process information received from the sub-modules $220_1$-$220_4$ and processing and segment data to be conveyed to the sub-modules $220_1$-$220_4$. The digital processing modules 252 may comprise an xxxMll for communicating with the MAC 122 via the bus 126 (FIG. 1).

Each of the analog processing modules $210_1$-$210_6$ represents suitable logic, circuitry, interfaces, and/or code for performing analog front end functions. Such functions may comprise, for example, filtering, amplification, digital-to-analog conversion, and analog-to-digital conversion. The analog processing modules $210_1$-$210_6$ may, for example, comprise a media dependent interface (MDI) operable to transmit and receive Ethernet physical layer signals over twisted pair cabling. The physical layer signals may, for example, be compatible with one or more of 10BASE-T, 100BASE-T, 1GBASE-T, 10GBASE-T, and Ethernet physical layer standards which may be defined in the future such as 40GBASE-T, and 100GBASE-T standards. Signals may be coupled from pin pairs 101-106 to analog processing modules $210_1$-$210_6$ via traces 111-116.

The switching elements $222_1$ and $222_2$ may comprise, for example, one or more transistors, transmission gates, multiplexers, and/or MEMS switches.

Each of the switch control modules $226_1$ and $226_2$ represents suitable logic, circuitry, interfaces, and/or code that may be operable to generate a signal 230 which may control the switching elements $222_1$ and $222_2$. In an embodiment of the invention, each of the signals $230_1$ and $230_2$ may be an analog signal or may be a digital signal of one or more bits. In an embodiment of the invention, each of the switch control modules $226_1$ and $226_2$ may be operable to control the switching elements $222_1$ and $222_2$ based on a voltage and/or current sensed on the one or more of the pin pairs 101-106. In an embodiment of the invention, the switch control modules $226_1$ and $226_2$ may be controlled, in part, by signal 228 which may be generated by the host 124, the MAC 122, and/or generated in the PHY 120. In an embodiment of the invention, the switch control modules $226_1$ and $226_2$ may be controlled independently and/or in unison.

In operation, Ethernet physical layer signals may be transmitted and/or received via one or more of the pin pairs 101-106. For reception, Ethernet physical layer signals received via a pin pair may be processed by an analog processing module $210_X$ coupled to the pin pair, where X is an integer from 1 to 6. Such processing may comprise conversion to a digital representation. If the analog processing module $210_X$ is coupled to a digital processing sub-module $220_Y$, the digital signals may then be conveyed from the analog processing module $210_X$ to the digital processing sub-module $220_Y$, where Y is an integer from 1 to 4. The digital processing sub-module $220_Y$ may then further process the signals before communicating them to the MAC 122. For transmission, digital signals output by a digital processing sub-module $220_Y$ may be conveyed to an analog processing module $210_X$ to which the digital processing sub-module $220_Y$ is coupled. The analog processing module $210_X$ may convert the digital signals to Ethernet physical layer signals and transmit the Ethernet physical layer signals onto a twisted pair to which it is coupled via one of the pin pairs 101-106.

The switch control module $226_1$ may control the switching element $222_1$ based on the signal $224_1$ which may indicate a voltage and/or current on the pin pair 101 and/or on the pin pair 103. In an embodiment of the invention, the digital processing sub-module $220_1$ may be coupled to the analog processing module $210_1$ when a non-zero voltage and/or current is detected on pin pair 101 and coupled to the analog processing module $210_3$ when zero voltage and/or current is detected on pin pair 103. In an embodiment of the invention, the digital processing sub-module $220_1$ may be coupled to analog processing module $210_1$ when a particular voltage and/or current, or particular pattern or series of voltage and/or current, is detected on pin pair 101, and coupled to the analog processing module $210_3$ when a particular voltage and/or current, or particular pattern or series of voltage and/or current, is detected on pin pair 103. In an embodiment of the invention, the digital processing sub-module $220_1$ may be coupled to the analog processing module $210_1$ when a zero voltage and/or current is detected on pin pair 103 and coupled to the analog processing module $210_3$ when a zero voltage and/or current is detected on pin pair 101.

Similarly, the switch control module $226_2$ may control the switching element $222_2$ based on the signal $224_2$ which may indicate a voltage and/or current on the pin pair 106 and/or on the pin pair 104. In an embodiment of the invention, digital processing sub-module $220_4$ may be coupled to analog processing module $210_6$ when a non-zero voltage and/or current is detected on pin pair 106 and coupled to analog processing module $210_4$ when a non-zero voltage and/or current is detected on pin pair 104. In an embodiment of the invention, digital processing sub-module $220_4$ may be coupled to analog processing module $210_6$ when a particular voltage and/or current, or particular pattern or series of voltage and/or current, is detected on pin pair 106, and coupled to analog processing module $210_4$ when a particular voltage and/or current, or particular pattern or series of voltage and/or current, is detected on pin pair 104. In an embodiment of the invention, digital processing sub-module $220_4$ may be coupled to analog processing module $210_6$ when a zero voltage and/or current is detected on pin pair 104 and coupled to analog processing module $210_4$ when a zero voltage and/or current is detected on pin pair 106.

In an embodiment of the invention, the switch control modules $226_1$ and $226_2$ may control the switching elements $222_1$ and $222_2$, based, at least in part, on the signal 228 which may indicate a mode of the PHY 120. In this regard, the PHY 120 may support more than one physical layer protocol, and the signal 228 may indicate which of the supported protocols the PHY 120 is currently configured, or being configured, to support. In an embodiment of the invention, when the signal 228 indicates that the PHY 120 is to be configured to support speeds higher than 10 gigabits per second, for example configured to operate in 40GBASE-T mode or 100GBASE-T mode, the switch control module $226_1$ may configure the switching element $222_1$ to couple the digital processing sub-module $220_1$ to the analog processing module $210_1$ and the switch control module $226_2$ may configure the switching element $222_2$ to couple the digital processing sub-module $220_4$ to the analog processing module $210_6$. In an embodiment of the invention, when the signal 228 indicates that the PHY 120 is to be configured to support speeds less than or equal to 10 gigabits per second, for example configured to operate in 10BASE-T mode, 100BASE-T mode, 1GBASE-T mode, or 10GBASE-T mode, the switch control module $226_1$ may configure the switching element $222_1$ to couple the digital processing sub-module $220_1$ to the analog processing module $210_3$ and the switch control module $226_2$ may configure the switching element $222_2$ to couple the digital processing sub-module $220_4$ to the analog processing module $210_4$.

Figure 2B:
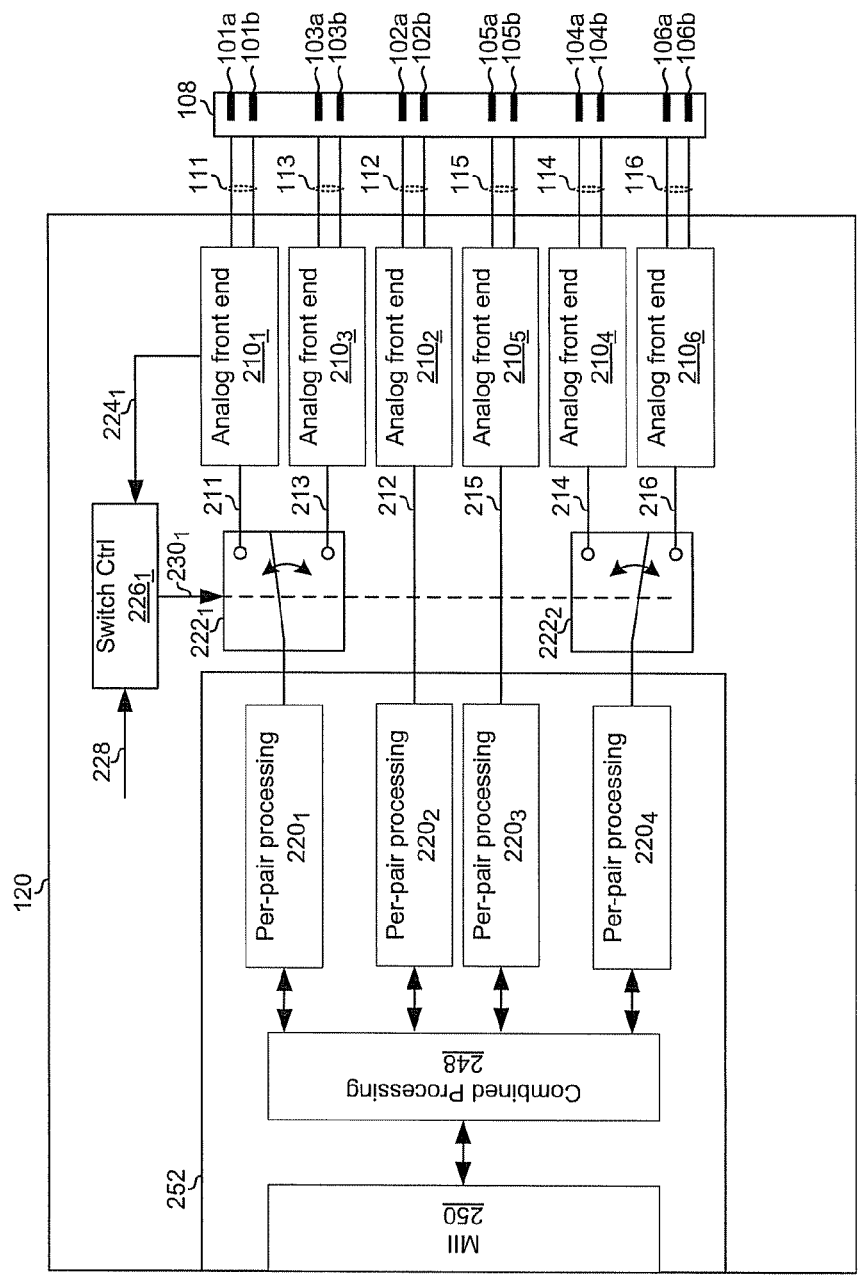
FIG. 2B is a block diagram illustrating an exemplary Ethernet PHY operable to control which pins of a connector are coupled to transmit and/or receive circuitry of the PHY, in accordance with an embodiment of the invention.

FIG. 2B is a block diagram illustrating an exemplary Ethernet PHY operable to control which pins of a connector are coupled to transmit and/or receive circuitry of the PHY, in accordance with an embodiment of the invention. FIG. 2B is similar to FIG. 2A in many respects, but depicts an embodiment in which switching elements $222_1$ and $222_2$ are controlled via a single switch control module $226_1$. In this manner, the Ethernet PHY 120, as depicted in FIG. 2B, may be smaller and/or less costly as it may require less circuitry than in FIG. 1A.

Figure 2C:
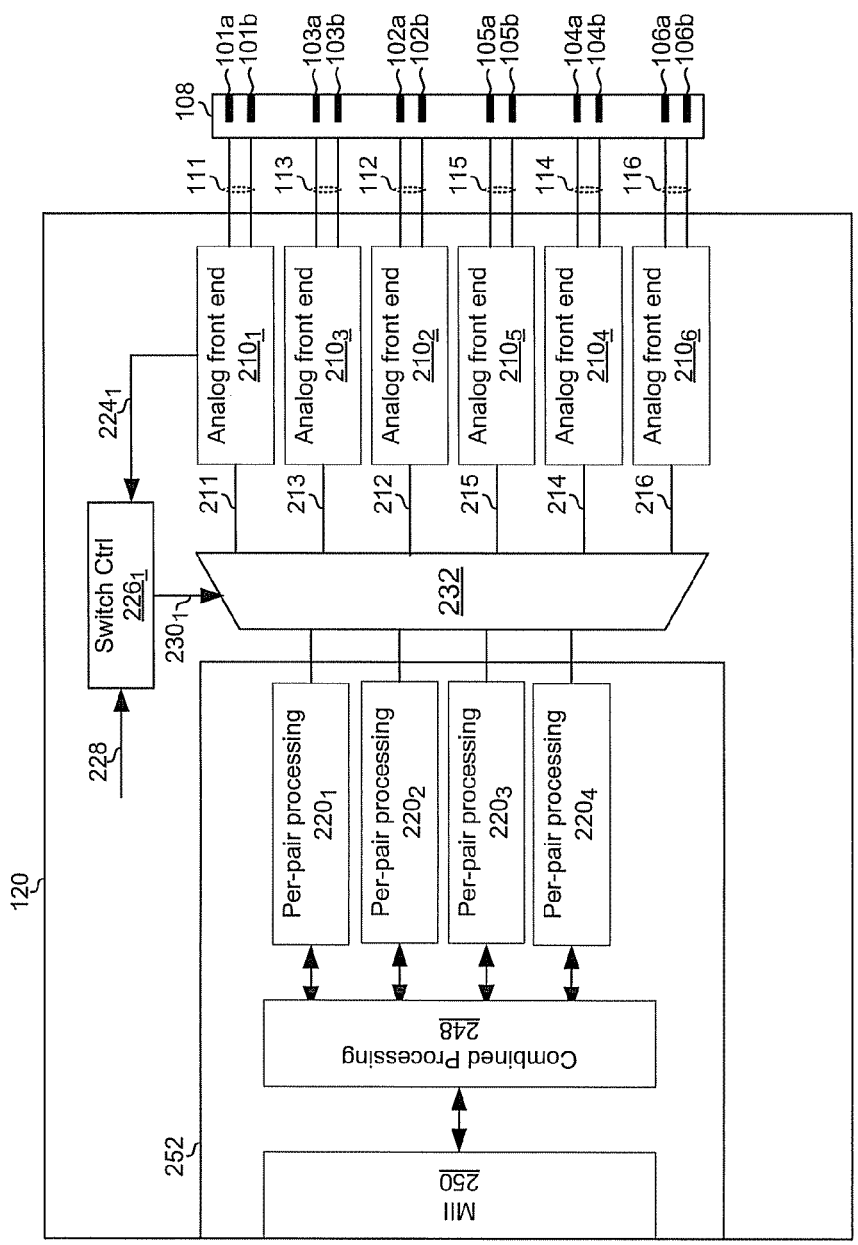
FIG. 2C is a block diagram illustrating an exemplary Ethernet PHY operable to control which pins of a connector are coupled to transmit and/or receive circuitry of the PHY, in accordance with an embodiment of the invention.

FIG. 2C is a block diagram illustrating an exemplary Ethernet PHY operable to control which pins of a connector are coupled to transmit and/or receive circuitry of the PHY, in accordance with an embodiment of the invention. Referring to FIG. 2C, the Ethernet PHY may comprise a switching element 232 operable to couple any four of the analog processing modules $210_1$-$210_6$ to the digital processing sub-modules $220_1$-$220_4$. That is, each of the digital processing sub-modules $220_1$-$220_4$ may be coupled to any one of the analog processing modules $210_1$-$210_6$.

Figure 2D:
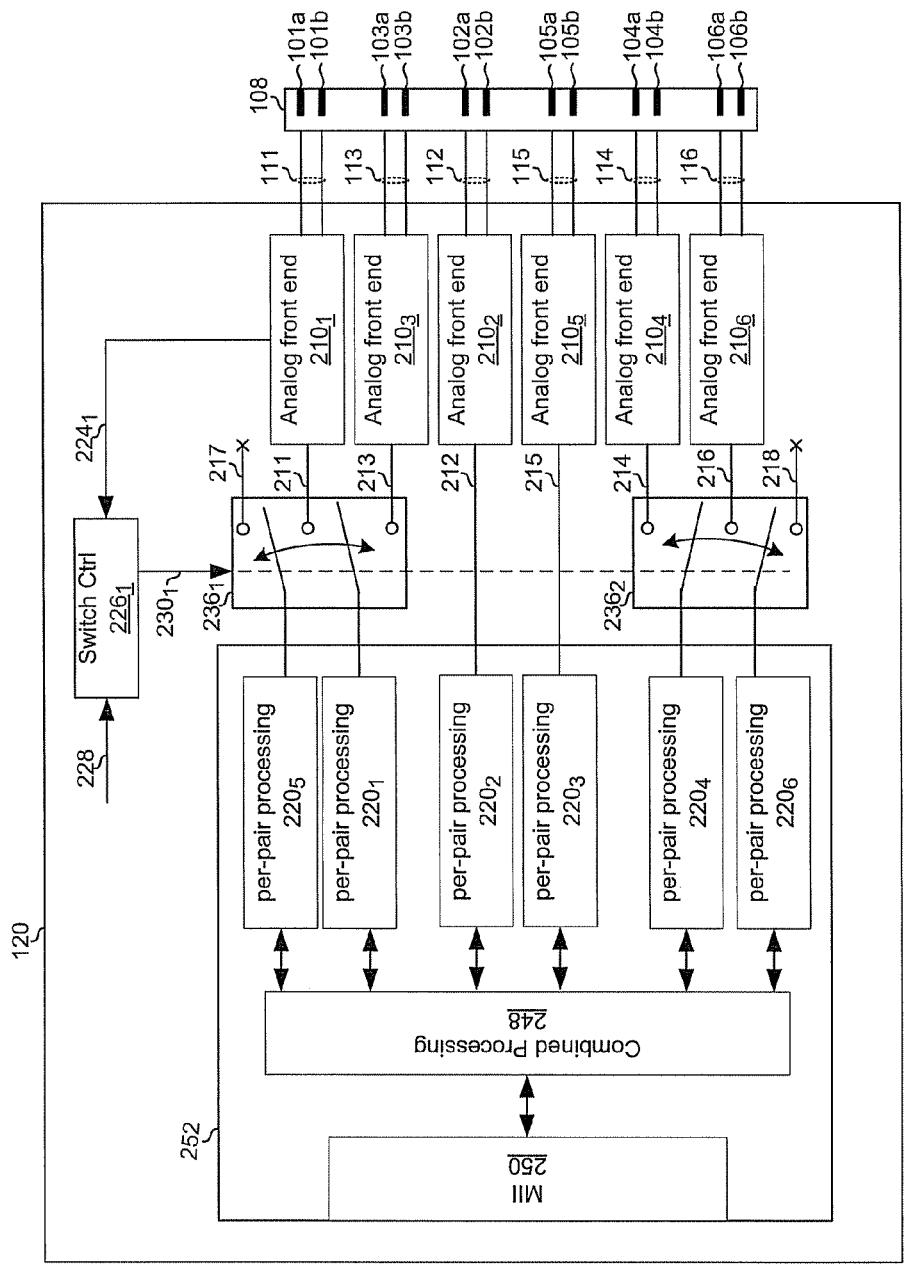
FIG. 2D is a block diagram illustrating an exemplary Ethernet PHY operable to control which pins of a connector are coupled to transmit and/or receive circuitry of the PHY, in accordance with an embodiment of the invention.

FIG. 2D is a block diagram illustrating an exemplary Ethernet PHY operable to control which pins of a connector are coupled to transmit and/or receive circuitry of the PHY, in accordance with an embodiment of the invention. Referring to FIG. 2D, the Ethernet PHY 120 may be operable to communicate over four twisted pairs and over six twisted pairs.

In a first configuration, the switching element $236_1$ may establish two communication paths, a first path comprising digital processing sub-module $220_5$, analog processing module $210_1$, and pin pair 101, and a second path comprising digital processing sub-module $220_1$, analog processing module $210_3$, and pin pair 113. While the switching element $236_1$ is in the first configuration, either or both of the paths may be active and either or both of the paths may be inactive. A path may be inactive when it is not coupled to a twisted pair, and/or when it is coupled to a twisted pair but communication over that twisted pair is unnecessary or undesirable. For example, paths may be placed in an inactive mode to conserve energy. In a second configuration of the switching element $236_1$ digital processing sub-module $220_5$ may not be coupled to any pins of the connector 108, and a communication path comprising digital processing sub-module $220_1$, analog processing module $210_1$, and pin pair 101 may be established.

In a first configuration, the switching element $236_2$ may establish two communication paths, a first path comprising the digital processing sub-module $220_6$, the analog processing module $210_6$, and pin pair 116, and a second path comprising the digital processing sub-module $220_4$, the analog processing module $210_4$, and pin pair 114. While the switching element $236_2$ is in the first configuration either or both of the paths may be active and either or both of the paths may be inactive. A path may be inactive when it is not coupled to a twisted pair, and/or when it is coupled to a twisted pair but communication over that twisted pair is unnecessary or undesirable. For example, paths may be placed in an inactive mode to conserve energy. In a second configuration of the switching element $236_2$, the digital processing sub-module $220_6$ may not be coupled to any pins of the connector 108, and a communication path comprising the digital processing sub-module $220_1$, the analog processing module $210_1$, and the pin pair 101 may be established.

In instances in which the Ethernet PHY 120 interfaces with a MAC that is operable to support communication over six twisted pairs, the switching elements $236_1$ and $236_2$ may be unnecessary and/or may remain configured into the first configuration. The switching elements $236_1$ and $236_2$ may, however, enable the Ethernet PHY 120 of FIG. 2D to be a drop-in replacement for an Ethernet PHY which only supports communication over four twisted pairs, such as the Ethernet PHY 120 of FIG. 2A, for example.

Figure 3A:
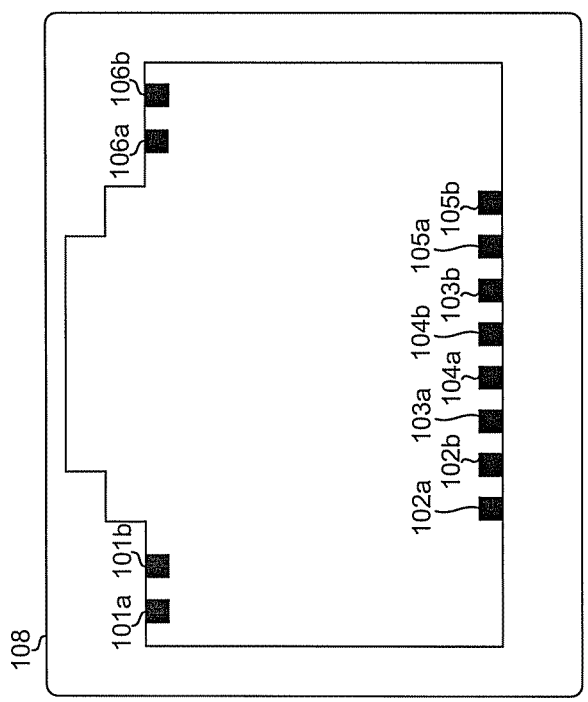
FIGS. 3A-3E illustrates a front view of a multi-standard, backward-compatible connector, in accordance with an embodiment of the invention.
Figure 3B:
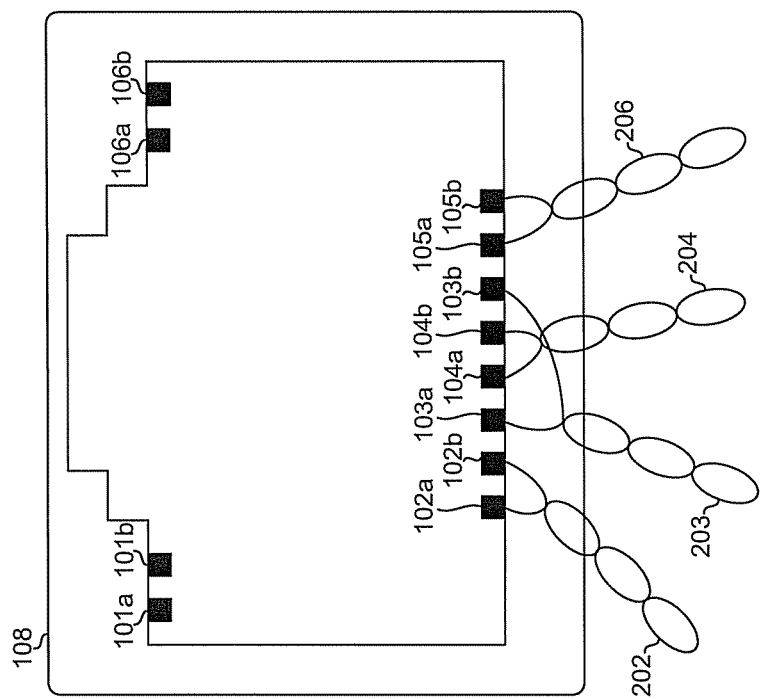
Figure 3C:
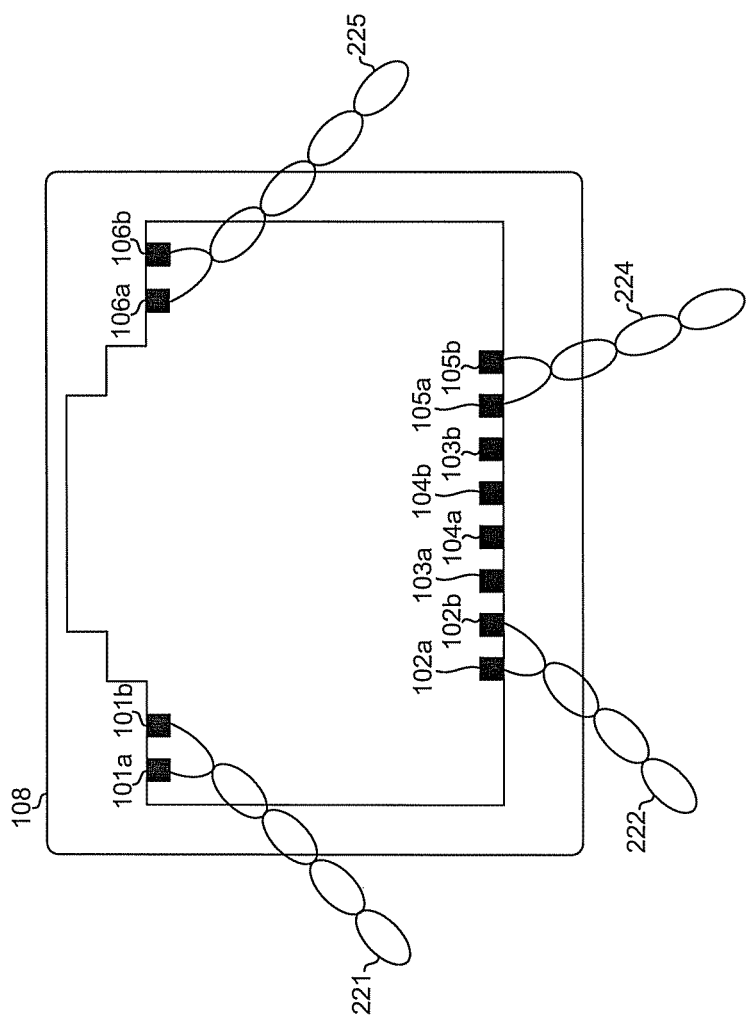
Figure 3D:
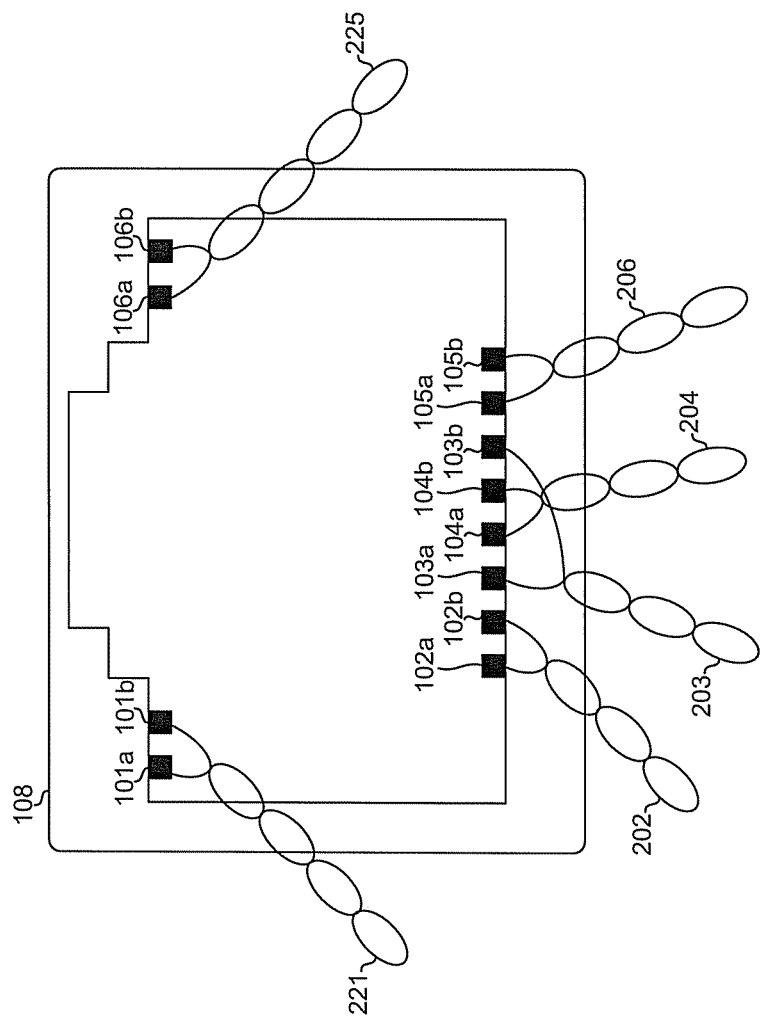
Figure 3E:
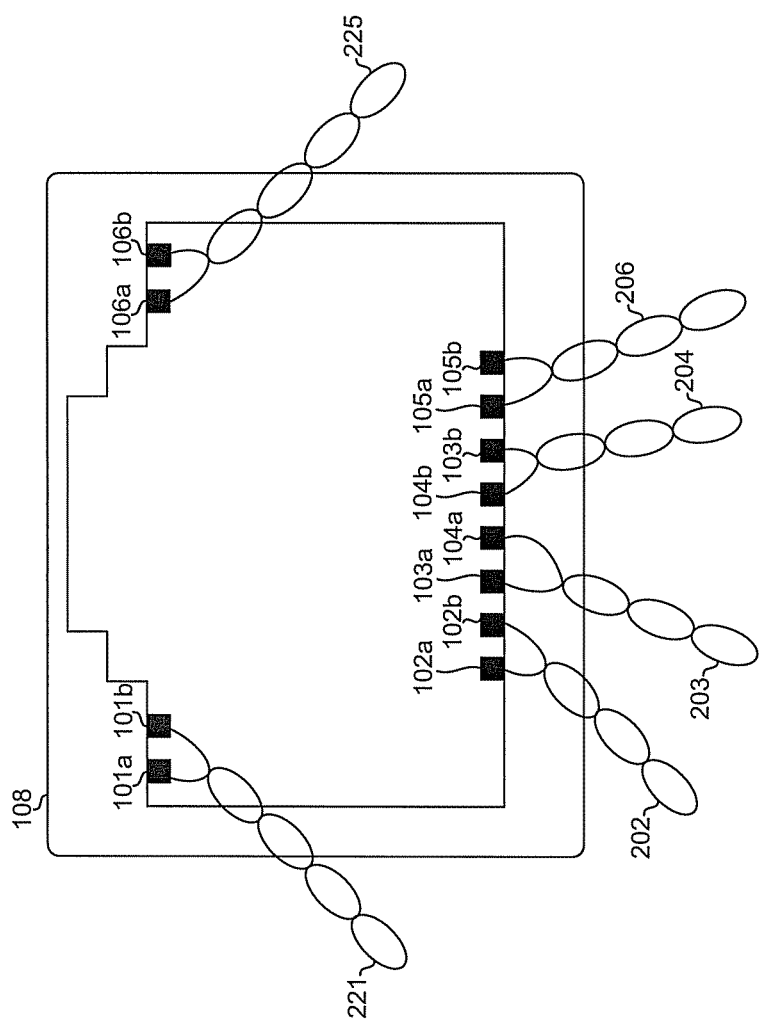

FIGS. 3A-3D illustrates a front-view of a connector, in accordance with an embodiment of the invention. Referring to FIG. 3A, the pins 101*a* and 101*b* may be located on a wall opposite the wall on which the pins 102*a*, 102*b*, 103*a*, 103*b*, 104*a*, 104*b*, 105*a*, and 105*b* are located. Similarly, the pins 106*a* and 106*b* may be located on a wall opposite the wall on which the pins 102*a*, 102*b*, 103*a*, 103*b*, 104*a*, 104*b*, 105*a*, and 105*b* are located. In instances that an RJ-45 connector is mated with the connector 108, the coupling to four twisted pairs may be as depicted in FIG. 3B. In instances that an ARJ-45 connector is mated with the connector 108, the coupling to four twisted pairs may be as depicted in FIG. 3C. In instances that a cable assembly comprising six pairs is inserted into the connector 108, the coupling to the six twisted pairs may be as depicted in FIG. 3D.

Figure 4:
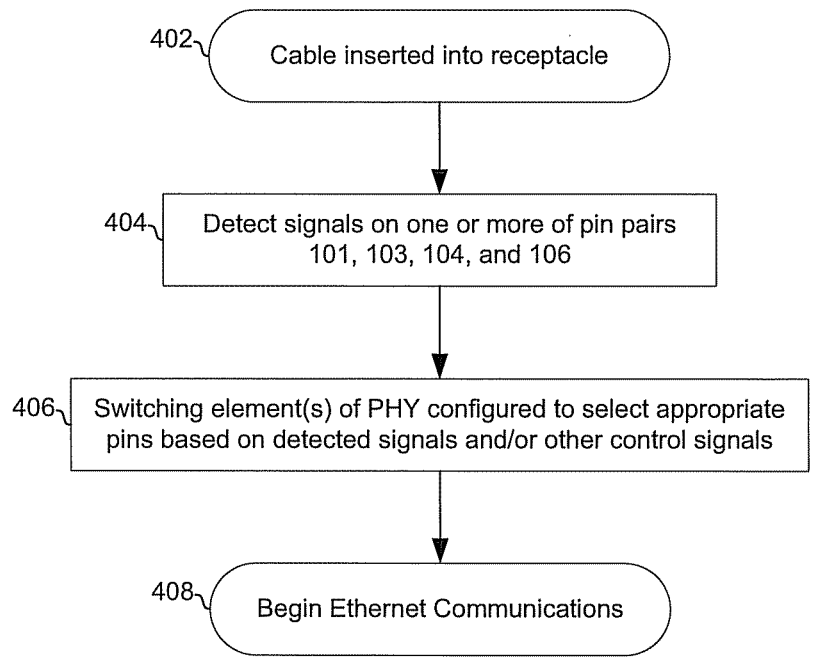
FIG. 4 is a flow chart illustrating exemplary steps for configuring an Ethernet PHY, in accordance with an embodiment of the invention.

FIG. 4 is a flow chart illustrating exemplary steps for configuring an Ethernet PHY, in accordance with an embodiment of the invention. Referring to FIG. 4, the exemplary steps may begin with step 402 in which the cable assembly 150 (FIG. 1) is inserted into the connector 108. In step 404, the Ethernet PHY may sense a voltage and/or current on one or more of pin pairs 101, 103, 104, and 106. In step 406, one or more switching elements may be configured to select which one or more of pin pairs 101-106 are coupled to which one or more of digital processing sub-modules $220_1$-$220_4$. In step 408, after configuration of the switching elements, Ethernet communications may begin by, for example, entering an autonegotiation mode.

Figure 5:
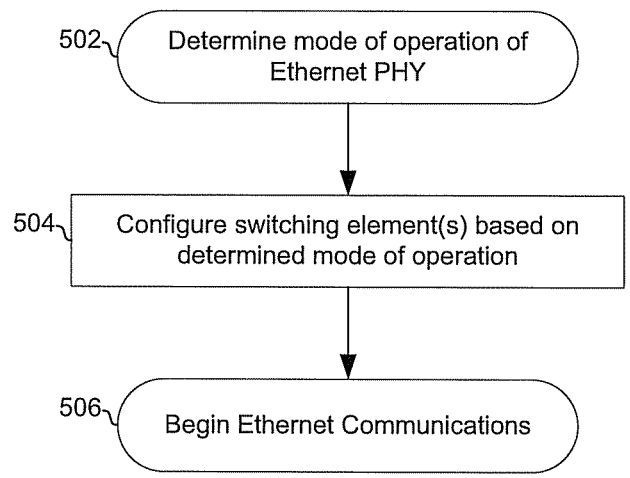
FIG. 5 is a flow chart illustrating exemplary steps for configuring an Ethernet PHY, in accordance with an embodiment of the invention.

FIG. 5 is a flow chart illustrating exemplary steps for configuring an Ethernet PHY, in accordance with an embodiment of the invention. Referring to FIG. 5, the exemplary steps may begin with step 502 in which a mode of operation of the Ethernet PHY 120 may be determined. The determination may be made based on one or more parameters such as, for example, user input, characteristics of the cable assembly 150 coupled to the connector 108, an amount of data to be communicated, a type of data to be communicated, a rate at which data is to be communicated over the cable assembly 150, based on applications running on a host 124 to which the Ethernet PHY is coupled, capabilities of the MAC 122, measured error rates of communications conducted over the cable assembly, or any other suitable parameter(s). Any one or more of these parameters, and/or other parameters, may be determined utilizing autonegotiation and/or similar protocols. Alternatively, any one or more of these parameters, and/or other parameters, may be determined before and/or after autonegotiation. The determination may be performed by the Ethernet PHY 120, the MAC 122, and/or the host 124. In step 104, one or more switching elements in the Ethernet PHY 120 may be configured based on the determination made in step 502. In step 506, after configuration of the switching elements, the communication of data in the form of Ethernet physical layer signals may begin.

Figure 6:
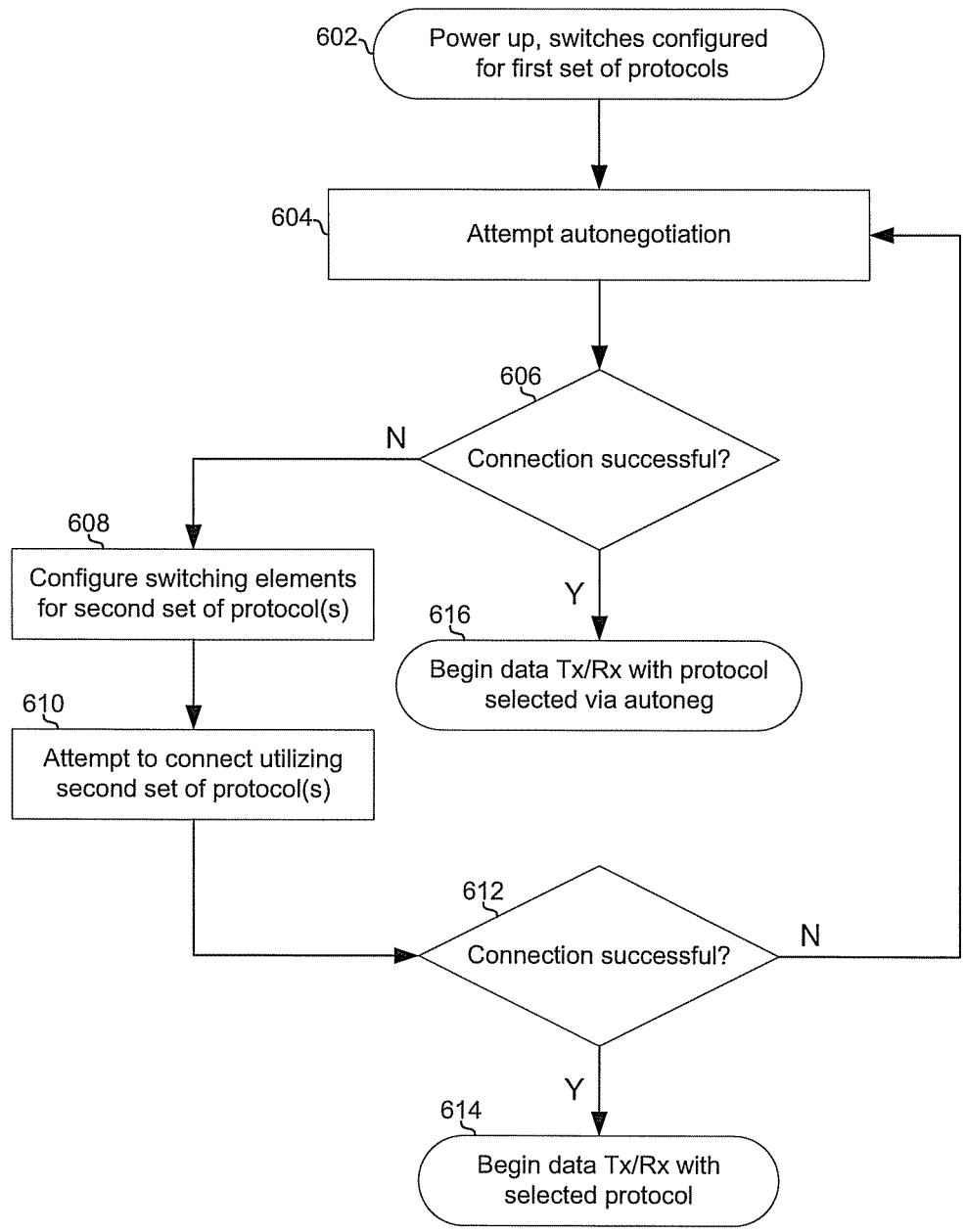
FIG. 6 is a flow chart illustrating exemplary steps for configuring an Ethernet PHY, in accordance with an embodiment of the invention.

FIG. 6 is a flow chart illustrating exemplary steps for configuring an Ethernet PHY, in accordance with an embodiment of the invention. Referring to FIG. 6, the exemplary steps may begin with step 602 in which the PHY 102 may be powered up with its one or more switching elements 222, 232, and/or 236 configured into a first configuration that supports a first one or more communication protocols. For example, in the first configuration the PHY 120 may support one or more Ethernet physical layer protocols that support 40 Gbps and/or 100 Gbps communications.

In step 604, the PHY 102 may attempt autonegotiation with a link partner. In step 606 it may be determined whether the PHY 102 was able to successfully establish a connection to a link partner utilizing autonegotiation. In instances that a connection is successfully established, the exemplary steps advance to step 616 and the PHY 102 may begin communicating data utilizing the physical layer protocol(s) selected during autonegotiation.

Returning to step 606, in instances that a connection is not successfully established with a link partner, the exemplary steps advance to step 608. In step 608, the one or more switching elements 222, 232, and/or 236 may be reconfigured into a second configuration that supports a second one or more communication protocols. For example, in the second configuration the PHY 120 may support a first one or more Ethernet physical layer protocols comprising one or more of 10BASE-T, 100BASE-T, 1GBASE-T and 10GBASE-T In step 610, the PHY 102 may attempt to establish a connection to a link partner using the one or more second protocols. In step 612 it may be determined whether the PHY 102 was able to successfully establish a connection to a link partner utilizing the second one or more protocols. In instances that an establishment of a connection is unsuccessful, the exemplary steps may return to step 604. In instances that a connection is established, the exemplary steps may advance to step 614 and the PHY 102 may begin communicating data utilizing the second one or more protocols.

Various aspects of a method and system for a high-speed backward compatible Ethernet connector are provided. In an exemplary embodiment of the invention, one or more switching elements 222, 232, and/or 236, in the Ethernet PHY 120, may be operable to control which of a plurality of pins 101a-106a and 101b-106b of a connector 108 are coupled to a first portion of one or more circuits, represented by analog processing modules 210, of an Ethernet PHY 120. The one or more switching elements 222, 232, and/or 236 may reside in a signal path between the first portion of the one or more circuits of the Ethernet PHY 120 and a second portion of the one or more circuits, represented by one or more digital processing sub-modules 220, of the Ethernet PHY 120. One or more configurations of the one or more switching elements 222, 232, and/or 236 may couple less than all of the plurality of pins to the first portion of the one or more circuits. Each signal into and out of the one or more switching elements 222, 232, and/or 236 may be a digital signal. The first portion of the one or more circuits may comprise a media independent interface. The portion of the one or more circuits may comprise a media dependent interface. A voltage and/or current present on one or more of the plurality of pins may be detected, and the one or more switching elements 222, 232, and/or 236 may be controlled based on a result of the detecting. The Ethernet PHY 120 may be configurable to support a plurality of Ethernet physical layer standards. At any given time, the one or more switching elements 222, 232, and/or 236 may be configured based on which one of said plurality of physical layer standards said Ethernet PHY 120 is configured to support at that time.

A first subset of the plurality of pins 101a-106a and 101b-106b may be coupled to the first portion of the one or more circuits, represented by one or more digital processing sub-modules 220, when a data rate of communications via the connector 108 is less than or equal to the maximum data rate set forth in the 10GBASE-T standard. A second subset of the plurality of pins may be coupled to the first portion of the one or more circuits when a data rate of communications via the connector is greater than the maximum data rate set forth in the 10GBASE-T standard. A first subset of the plurality of pins may be coupled to the first portion of the one or more circuits when the Ethernet PHY is configured to communicate in accordance with one of 10BASE-T, 100BASE-T, 1GBASE-T, and 10GBASE-T standards. A second subset of the plurality of pins may be coupled to the first portion of the one or more circuits when the Ethernet PHY is configured to communicate in accordance with one of 40GBASE-T and 100GBASE-T standards. The one or more switching elements 222, 232, and/or 236 may switch between one or more pins mounted on a first wall of the connector, pins 102a and 102b, for example, and one or more pins mounted on a second wall of the connector opposite the first wall, pins 101a and 101b, for example. The first portion of the one or more circuits, represented by one or more digital processing sub-modules 220, the second portion of the one or more circuits, represented by one or more analog processing modules 210, and the one or more switching elements 222, 232, and/or 236 may be integrated on a single integrated circuit die.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for high-speed backward-compatible Ethernet connector.

Accordingly, the present invention may be realized in hardware, software, or a combination of hardware and software.

The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
in an Ethernet PHY comprising one or more switching elements and one or more circuits:
controlling, via said one or more switching elements, which of a plurality of pins of a connector are communicatively coupled to a first portion of said one or more circuits, wherein said one or more switching elements reside in a signal path between said first portion of said one or more circuits and a second portion of said one or more circuits:
coupling, by the one or more switching elements, a first subset of said plurality of pins to said first portion of said one or more circuits when said Ethernet PHY is configured to communicate in accordance with at least one of 10BASE-T, 100BASE-T, 1GBASE-T, and 10GBASE-T standards; and
coupling, by the one or more switching elements, a second subset of said plurality of pins to said first portion of said one or more circuits when said Ethernet PHY is configured to communicate in accordance with at least one of 40GBASE-T and 100GBASE-T standards,
wherein each of said plurality of pins of said connector are configurable to be communicatively coupled to said first portion of any of said one or more circuits by said one or more switching elements, and
one or more configurations of said one or more switching elements communicatively couples less than all of said plurality of pins to said first portion of said one or more circuits, pins not coupled by the one or more switching elements being inactive.

2. The method according to claim 1, wherein each signal into and out of said one or more switching elements is a digital signal.

3. The method according to claim 1, wherein:
said first portion of said one or more circuits comprises a media independent interface; and
said second portion of said one or more circuits comprises a media dependent interface.

4. The method according to claim 1, comprising:
detecting a voltage and/or current present on one or more of said plurality of pins; and
configuring said one or more switching elements based on a result of said detecting.

5. The method according to claim 1, wherein:
said Ethernet PHY is configurable to support a plurality of Ethernet physical layer standards; and
said one or more switching elements are configured based on which one of said plurality of physical layer standards said Ethernet PHY is configured to support.

6. The method according to claim 1, comprising:
coupling a first subset of said plurality of pins to said first portion of said one or more circuits when a data rate of communications via said connector is less than or equal to a maximum data rate set forth in a 10GBASE-T standard; and
coupling a second subset of said plurality of pins to said first portion of said one or more circuits when a data rate of communications via said connector is greater than the maximum data rate set forth in the 10GBASE-T standard.

7. The method according to claim 1, wherein said one or more switching elements switch between one or more pins mounted on a first wall of said connector and one or more pins mounted on a second wall of said connector, where said first wall is opposite said second wall.

8. The method according to claim 1, wherein said first portion of said one or more circuits, said second portion of said one or more circuits, and said one or more switching elements are integrated on a single integrated circuit die.

9. The method according to claim 1, comprising configuring said one or more switching elements based on parameters determined during autonegotiation.

10. A system comprising:
an Ethernet PHY comprising one or more switching elements and one or more circuits, the Ethernet PHY is configured to:
control, via said one or more switching elements, which of a plurality of pins of a connector are communicatively coupled to a first portion of said one or more circuits, wherein said one or more switching elements reside in a signal path between said first portion of said one or more circuits and a second portion of said one or more circuits,
couple, via the one or more switching elements, a first subset of said plurality of pins to said first portion of said one or more circuits when said Ethernet PHY is configured to communicate in accordance with at least one of 10BASE-T, 100BASE-T, 1GBASE-T, and 10GBASE-T standards; and
couple, via the one or more switching elements, a second subset of said plurality of pins to said first portion of said one or more circuits when said Ethernet PHY is configured to communicate in accordance with at least one of 40GBASE-T and 100GBASE-T standards,
wherein each of said plurality of pins of said connector are configurable to be communicatively coupled to said first portion of any of said one or more circuits by said one or more switching elements, and
one or more configurations of said one or more switching elements communicatively couples less than all of said plurality of pins to said first portion of said one or more circuits, pins not coupled by the one or more switching elements being inactive.

11. The system according to claim 10, wherein each signal into and out of said one or more switching elements is a digital signal.

12. The system according to claim 10, wherein:
said first portion or said one or more circuits comprises a media independent interface; and
said second portion of said one or more circuits comprises a media dependent interface.

13. The system according to claim 10, wherein said one or more circuits are configured to:
detect a voltage and/or current present on one or more of said plurality of pins; and
configure said one or more switching elements based on a result of said detection.

14. The system according to claim 10, wherein:
said Ethernet PHY is configurable to support a plurality of Ethernet physical layer standards; and
said one or more switching elements are configured based on which one of said plurality of physical layer standards said Ethernet PHY is configured to support.

15. The system according to claim 10, wherein said one or more circuits are configured to:
couple a first subset of said plurality of pins to said first portion of said one or more circuits when a data rate of communications via said connector is less than or equal to a maximum data rate set forth in a 10GBASE-T standard; and
couple a second subset of said plurality of pins to said first portion of said one or more circuits when a data rate of communications via said connector is greater than the maximum data rate set forth in the 10GBASE-T standard.

16. The system according to claim 10, wherein said one or more switching elements switch between one or more pins mounted on a first wall of said connector and one or more pins mounted on a second wall of said connector, where said first wall is opposite said second wall.

17. The system according to claim 10, wherein said first portion of said one or more circuits, said second portion of said one or more circuits, and said one or more switching elements are integrated on a single integrated circuit die.

18. The system according to claim 10, wherein said one or more circuits are configured to configure said one or more switching elements based on parameters determined during autonegotiation.

* * * * *